US010845799B2

(12) United States Patent
Song et al.

(10) Patent No.: US 10,845,799 B2
(45) Date of Patent: Nov. 24, 2020

(54) UNMANNED AERIAL VEHICLE, REMOTE CONTROLLER, AND CONTROL METHOD THEREOF (71) Applicant: SZ DJI TECHNOLOGY CO., LTD., Shenzhen (CN)

(72) Inventors: Liang Song, Shenzhen (CN); Deen Zheng, Shenzhen (CN); Yazhen Wei, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/513,028

(22) Filed: Jul. 16, 2019

(65) Prior Publication Data
US 2019/0384279 A1 Dec. 19, 2019

Related U.S. Application Data (63) Continuation of application No. PCT/CN2017/071380, filed on Jan. 17, 2017.

(51) Int. Cl.
G05D 1/00 (2006.01)
H04W 36/00 (2009.01)
B64C 39/02 (2006.01)
H04W 36/16 (2009.01)
H04W 36/30 (2009.01)
H04W 88/06 (2009.01)

(52) U.S. Cl.
CPC ......... G05D 1/0022 (2013.01); B64C 39/024 (2013.01); G05D 1/0038 (2013.01); H04W 36/0011 (2013.01); H04W 36/03 (2018.08); H04W 36/165 (2013.01); H04W 36/30 (2013.01); B64C 2201/027 (2013.01); B64C 2201/146 (2013.01); H04W 88/06 (2013.01)

(58) Field of Classification Search
CPC ............ B64C 39/024; B64C 2201/146; B64C 2201/00
See application file for complete search history.

(56) References Cited

U.S. PATENT DOCUMENTS

2010/0302359 A1* 12/2010 Adams .................. B64C 39/024
348/117
2012/0022719 A1* 1/2012 Matos .................. B64C 39/024
701/2
(Continued)

FOREIGN PATENT DOCUMENTS

CN 1388699 A 1/2003
CN 101076022 A 11/2007
(Continued)

OTHER PUBLICATIONS

World Intellectual Property Organization (WIPO) International Search Report for PCT/CN2017/071380 dated Oct. 19, 2017 6 pages.

Primary Examiner — Keith Ferguson
(74) Attorney, Agent, or Firm — Anova Law Group, PLLC (57) ABSTRACT The present disclosure provides a control method for an UAV (Unmanned Aerial Vehicle) and a remote controller. The method includes transmitting a signal to the remote controller through a first communication network; receiving a first signal switching command; and switching from the first communication network to a second communication network to transmit the signal to the remote controller.

17 Claims, 9 Drawing Sheets (56) References Cited

U.S. PATENT DOCUMENTS

| | | | |
|---|---|---|---|
| 2016/0117853 A1* | 4/2016 | Zhong | B64C 39/024 345/634 |
| 2016/0300492 A1 | 10/2016 | Pasko et al. | |
| 2017/0004662 A1* | 1/2017 | Gong | B64C 9/00 |

FOREIGN PATENT DOCUMENTS

| | | | |
|---|---|---|---|
| CN | 202679644 U | | 1/2013 |
| CN | 104811234 A | | 7/2015 |
| CN | 105682158 A | * | 6/2016 |
| CN | 105682158 A | | 6/2016 |

\* cited by examiner

UNMANNED AERIAL VEHICLE, REMOTE CONTROLLER, AND CONTROL METHOD THEREOF

CROSS-REFERENCE TO RELATED APPLICATION

This application is a continuation application of International Application No. PCT/CN2017/071380, filed on Jan. 17, 2017, the entire content of which is incorporated herein by reference.

TECHNICAL FIELD

The present disclosure provides a control method for an Unmanned Aerial Vehicle (UAV) and its remote controller, and a corresponding UAV and a remote controller. The present disclosure relates to a coordinated remote control using a dual-mode communication, more specifically, to a method of enhancing an ordinary wireless remote control by using an additional mobile communication mode. The present disclosure relates to the technical fields of wireless data transmission, mobile communication, etc.

BACKGROUND

With the advance of technology and the reduction of cost, more and more users are starting to use UAVs, model airplanes, and unmanned vehicles for aerial photography, competition, entertainment, and other activities. When using these devices, an operator may operate a remote controller to transmit a remote control signal to the controlled device to control its movement or operation. The controlled device may transmit its own operating state, acquired images, sound, etc. to the remote controller. As such, the operator may observe the operating state of the controlled device and determine the action of a subsequent operation. The stability and timeliness of the wireless connection between the remote controller and the controlled device may directly affect the operational safety and user experience, which is a crucial part in the field of remote control.

SUMMARY

One aspect of the present disclosure provides a control method for an UAV (Unmanned Aerial Vehicle) and a remote controller. The method includes transmitting a signal to the remote controller through a first communication network; receiving a first signal switching command; and switching from the first communication network to a second communication network to transmit the signal to the remote controller.

Another aspect of the present disclosure provides a control method of a remote controller communicating with an UAV. The method includes transmitting a signal to the UAV through a first communication network; receiving a first signal switching command; and switching from the first communication network to a second communication network to transmit the signal to the UAV.

Another aspect of the present disclosure provides an UAV control system that includes an UAV and a remote controller. The UAV includes a first transceiver for communicating with the remote controller through a first communication network; a second transceiver for communicating with the remote controller through a second communication network; and one or more processors. The one or more processors are configured to transmit a first signal to the remote controller through the first transceiver; receive a first signal switching command; and switch from the first transceiver to the second transceiver to transmit the first signal to the remote controller after receiving the first signal switching command.

Further, the remote controller includes a first transceiver for communicating with the UAV through the first communication network; a second transceiver for communicating with the UAV through the second communication network; and one or more processors. The one or more processors are configured to transmit a signal to the UAV through the first communication network; receive a first signal switching command; and switch from the first communication network to the second communication network to transmit the signal to the UAV.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE EMBODIMENTS

In the present specification, the following description of various embodiments for describing the principles of the present disclosure is illustrative only and should not be construed as limiting the scope of the disclosure in any way. The following description of the drawings, with reference to the accompanying drawings, is provided to assist in a comprehensive understanding of the example embodiments of the disclosure as defined by the claims and their equivalents. The following description includes many specific details to assist in the understanding, but such details are to be regarded as merely exemplary. Accordingly, those of ordinary skill in the art will recognize that numerous changes and modifications can be made to the embodiments described herein without departing from the scope and spirit of the present disclosure. In addition, descriptions of well-known functions and structures are omitted for clarity and conciseness. In addition, the same reference numerals are used for the same or similar functions and operations throughout the accompanying drawings. In the present disclosure, the term "comprising" and "including" as well as their derivatives mean to contain rather than limit; the term "or", which is also inclusive, means and/or.

In view of the advantages and disadvantages of the conventional technology, the present disclosure provides a cooperative remote control method based on dual-mode communication, and a control method for an UAV and a control method of a remote controller for remote controlling the UAV based on the cooperative remote control method. The method of the present disclosure may be applied in a remote control system including one or more remote controllers and one or more controlled devices. The method provides two communication modes for the communication between the remote controller and the controlled device in order to establish a communication connection between the remote controller and the controlled device. In one embodiment, the communication modes may respectively be a wireless communication and a mobile communication. The wireless communication may refer to a communication based on a wireless transmission protocol. The mobile communication may refer to a communication based on a mobile communication network. However, the present disclosure is not limited to a specific communication mode as one of the objects of the present disclosure is to provide a flexible cooperation between two communication modes to increase the adaptability to changes in the application environment. In one embodiment, the controlled device may be an UAV, and the remote controller may be a remote controller of the UAV. The two communication modes in some embodiments of the present disclosure may refer to communications of two different wireless protocols.

Figure 1:
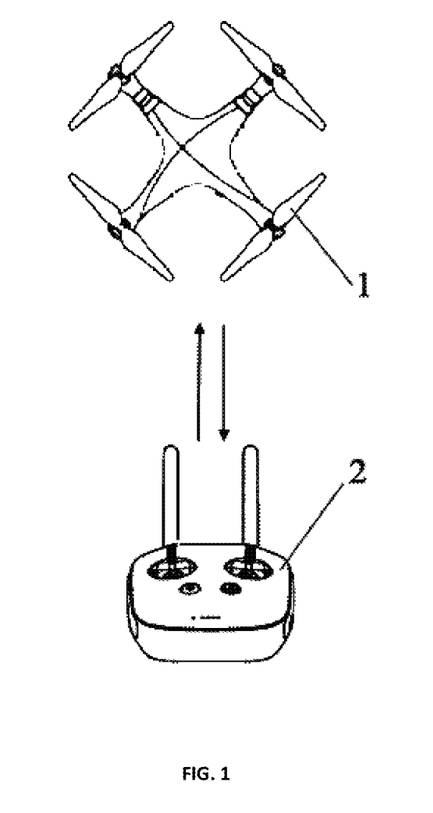
FIG. 1 is a schematic diagram of establishing a direction connection between a remote controller and a controlled device through a wireless connection.
Figure 2:
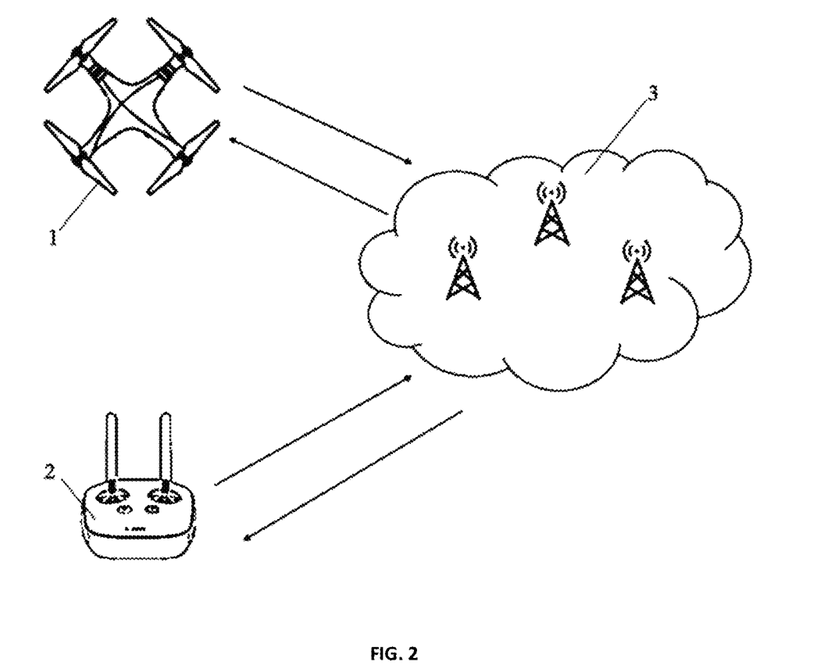
FIG. 2 is a schematic diagram of establishing an indirect connection between a remote controller and a controlled device through a mobile communication network.

There are two primary methods to establish a wireless connection between the remote controller and the controlled device. The first method is shown in FIG. 1, in which the remote controller and the controlled device may establish a direct connection by directly transmitting wireless signals to each other without using an intermediary. The second method is shown in FIG. 2, in which the remote controller and the controlled device may not establish a direct connection, but each may have a mobile communication module and the remote controller and the controlled device may respectively register with a mobile communication network. After the registration is successful, the remote controller and the controlled device may establish an indirect connection through the mobile communication network.

Many UAVs, model airplanes, and unmanned vehicles adapt the first method. They generally use the free frequency band of 2.4/5.8 GHz to establish a direct connection. The advantage of the first method is that the system has low complexity, easy to maintain, and has low usage cost. In the absence of interference and occlusion, the delay is low, the bandwidth is high, and the user experience is satisfactory.

As mobile communication technologies evolve to the third generation and the fourth generation (3G/4G), mobile networks may be used to provide greater bandwidth and lower latency. As such, it is technically feasible to transmit control, images, and sound over the mobile communication network. A small number of UAVs, model airplanes, unmanned vehicles, and other equipment have started to use the mobile communication network to establish an indirect connection with the remote controller. The advantage of this method is that the frequency band is dedicated, and the interference is low. As long as there is a mobile communication network, long distance transmission may be realized. Further, even if there is occlusion between the remote controller and the controlled device, the remote control or the data transmission may still not be affected, and functions such as over-the-horizon remote control, video transmission, and image transmission may be realized.

Due to regulatory requirements, the power of the wireless transmission of the free frequency bands is limited. In addition, Wi-Fi also works in these two frequency bands, hence, the free frequency bands of 2.4/5.8 GHz is crowded with interference. Generally, only the transmission distance of several hundred meters to several kilometers may be realized. Further, since the diffractive performance and the penetrating performance of the high-frequency radio waves are relatively poor, when an obstacle is between the remote controller and the controlled device, the signal may be interrupted. For devices such as UAVs, model airplanes, and unmanned vehicles, it may be very dangerous to have a poor remote signal or a signal interruption as it may be easy to cause accidents, which may result in property damage or casualty.

The indirect connection between the remote controller and the controlled device through the mobile communication network uses a dedicated frequency band. Although there are advantages such as less interference and long communication distance, the data fee of the mobile communication network is high, and the operating cost is extremely costly. In addition, there may be a delay in data transmission. Since data needs to be forwarded through the mobile communication network, the data delay may be longer than the delay of the direction connection method.

It can be seen that although the direct connection method has lower cost and shorter delay, but it is susceptible to interference, the communication distance is short, and the signal is easily lost when there is occlusion. The indirect connection method through the mobile communication network has longer communication distance and wider coverage, but the delay may be long, and the cost may be high.

However, in one embodiment, the environments to which the two communication modes are applied may be complementary. As such, when a communication connection based on one of the two communication modes becomes unavailable or unreliable in an environment, it may be switched to another communication connection based on another communication mode that may still be available in the environment. For example, one communication mode may be a direct connection established between the remote controller and the controlled device by directly transmitting wireless signals to each other without using an intermediary. Another communication mode may be that a connection may not be directly established between the remote controller and the controlled device, but a connection may be established through an intermediary (such as a mobile communication network), such that an indirect connection may be established between the remote controller and the controlled device.

In one embodiment of the control method of the UAV, the UAV may transmit a signal to the remote controller that may be remotely controlling the UAV through a first communication network. Further, the UAV may receive a first signal switching command and switch from the first communication network to a second communication network to transmit the signal to the remote controller based on the first signal switching command. For example, the UAV may receive the first signal switching command directly from the remote controller. The first communication network and the second communication network generally refer to a communication network in different communication modes and may include a network established communicating under various communication modes, such as a mobile communication network, a Wi-Fi communication network, Bluetooth, infrared, Zigbee, and the like. The communication network is not limited to a direct connection or an indirect connection. In one embodiment, the first communication network may be a wireless communication network, and the second communication network may be a mobile communication network. In another embodiment, the UAV may further receive a second signal switching command from the remote controller and switch from the second communication network to the first communication network to transmit the signal to the remote controller based on the second signal switching command.

In another embodiment of the control method of the UAV, correspondingly, the remote controller may transmit a signal to the UAV through the first communication network and receive the first signal switching command; and switch from the first communication network to the second communication network to transmit the signal to the UAV based on the first signal switching command.

The signal switching command described above may refer to a command for controlling the UAV or the remote controller to perform the switching of the communication network signal, and is not limited to a specific instruction format, nor is it limited to the body generating the command. For example, the signal switching command of the UAV may be obtained from the remote controller, and the signal switching command of the remote controller may be generated by receiving a user operation. In addition, both the UAV and its remote controller may need to be equipped with two transceivers to respectively communicate through the first communication network and the second communication network.

The "cooperation" between the two communication modes mentioned in the present disclosure may include, but is not limited to: state transitions such as starting, maintaining, working, and disconnecting of the communication modes, and an allocation and a switching of allocation for different types of data in different communication modes. The method of cooperation between the two communication modes may be switched automatically or manually based on a user operation. If an automatic switch is performed, it may be necessary to detect a state of the current communication connection to automatically switch the mode of cooperation between the two communication modes based on the detected state. For example, when the UAV (or the remote controller) detects a signal interruption in the first communication network, it may automatically switch to the second communication network to continue the communication with the remote controller (or the UAV). If a manually switch is performed, the state of the current communication connection may be selectively prompted to the user through a user operation interface. As such, the user may perform a timely operation based on the needs. In one embodiment, the prompting of the user operation may be achieved by displaying a plurality of operation options in a graphical interface on the remote controller.

In one embodiment, the cooperation method of switching between the two communication modes may include the starting or stopping of the communication connection of one of the communication modes, the switching of data transmission on a communication connection of one communication mode to a communication connection of another communication mode, and simultaneously transmitting data through the two communication modes.

When the two communication modes are respectively a wireless communication and a mobile communication, or when the first communication network and the second communication network are respectively a wireless communication and a mobile communication, the wireless communication network of the wireless communication connection may be used first to transmit the signal. For example, the remote controller and the controlled device may attempt and use a direct wireless communication first. However, as a backup, when the remote controller and the controlled device establish a communication connection based on the wireless communication, they may detect if there is a mobile communication network. If there is a mobile communication network, a mobile communication connection may be established and remain silent.

The present disclosure proposes a real-time determination based on a state of a wireless signal in a direct connection. When the signal in the direct connection is normal, the direct connection may be used to transmit data first. When the signal of the direct connection is unstable, disconnected, or blocked, the connection may be temporarily switched to an alternate communication connection based on the mobile communication network. Therefore, the stability of communication between the remote control and the controlled device may be improved, the operating range of the controlled device may be expanded, the security of the controlled device may be improved, and the operating cost may be reduced. Using this method, when the direct connection signal is normal, a good experience of low delay and high bandwidth between the remote controller and the controlled device may be ensured; and when the distance is long, the interference is strong, or an obstacle is blocking the communication, the remote controller may still be connected to the controlled device to ensure that the controlled device may be in a controlled state and remotely controlled by the operator so the controlled device may leave a danger zone. Once the direct connection signal regains stabilization, the communication connection may be switched back to the direct connection to reduce the operating cost and the transmission delay.

Based on the cooperation method, when the wireless communication connection is disconnected or the signal is weak and the mobile communication connection is normal, at least a part of the signal transmission may be automatically switched to the mobile communication connection. Alternatively, when it is detected that the wireless communication connection is disconnected or the signal is weak and the mobile communication connection is normal, the user may be prompted to perform an operation, and the communication connection state may be maintained or at least a part of the signal transmission may be switched to the mobile communication connection based on the user operation. In addition, at least a part of the signal transmission may be automatically switched to the wireless communication connection when the mobile communication connection is used for signal transmission and the wireless communication connection is detected to be normal. Alternatively, when the mobile communication connection is used for signal transmission and the wireless communication connection is detected to be normal, the user may be prompted to perform an operation, and the communication connection state may be maintained or at least a part of the signal transmission may be switched to the wireless communication connection based on the user operation.

It should be noted that a partial signal may include at least a part of the control signal or the data signal. The control signal may refer to a signal for controlling the action of an actuator of the controlled device. The data signal may generally refer to a signal collected by the controlled device, for example, it may include an image signal, a video signal, an audio signal, and a state signal of the controlled device. Further, the state signal may include one or more of the location, speed, and altitude of the controlled device. Further, in order to conserve the signal bandwidth, the image signal, video signal or audio signal may be generally transmitted as a data signal compressed at a specific bit rate. In one embodiment, when the partial signal being switched includes a data signal compressed at a specific bit rate, the bit rate may be automatically configured at the time of switching or configured by a user operation.

In order to make the objects, technical solutions, and advantages of the present disclosure more apparent, the present disclosure will be further described in detail below in conjunction with the specific embodiments and with reference to the accompanying drawings.

Figure 3:
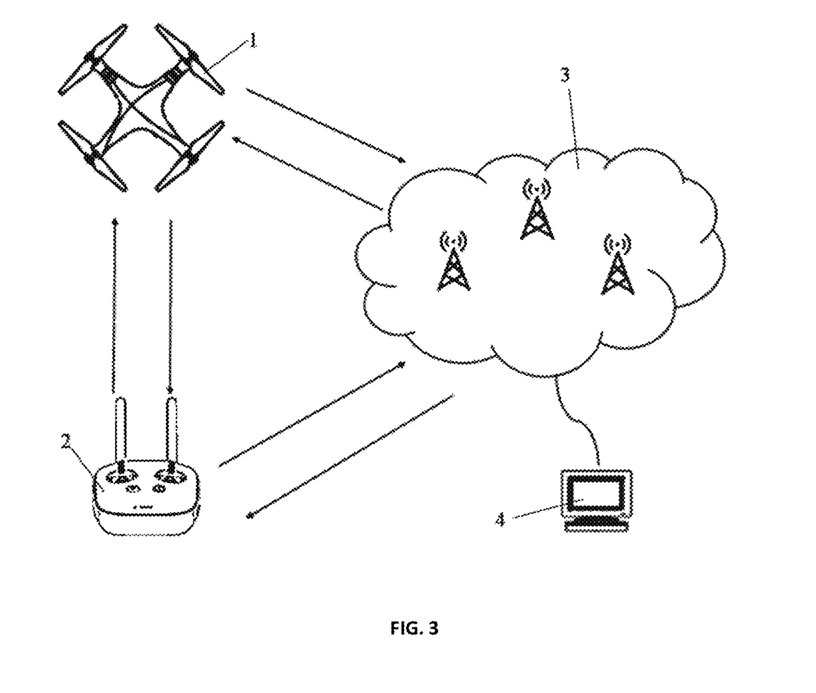
FIG. 3 is a schematic diagram of a communication connection of a remote control system according to an embodiment of the present disclosure.

FIG. 3 is a schematic diagram of a communication connection of a remote control system according to an embodiment of the present disclosure. In this embodiment, the controlled device may be a UAV 1 and the remote controller may be a remote controller 2 of the UAV. As shown in FIG. 3, a direct wireless connection may be established between the remote controller and the controlled device, that is, connected through a wireless communication network, and the remote controller and the controlled device may also be both connected to a mobile communication network 3 at the same time. It should be understood that although this embodiment is being described using a remote control system composed of the UAV 1 and its remote controller 2, the remote controller and the controlled device in the remote control system may not be limited to specific devices. The controlled device may be any executable device that may be remotely controlled to perform a corresponding action, such as a robot, an unmanned vehicle, an UAV, an unmanned airplane, and the like. The remote controller may be any device with a remote control function, including a dedicated remote controller, a smart device with remote control functions, such as a smartphone, a tablet, or a plurality of electronic devices combined to have remote control functions, such as a combination of a smartphone and a wireless communication remote controller.

When the remote controller is a combination of a plurality of electronic devices, different electronic devices may support different communication modes. For example, when the remote controller is a combination of a smartphone and a wireless remote controller, the wireless remote controller may be used to establish the direct wireless connection, and the smartphone may be used to establish a connection with the mobile communication network.

In addition, the remote control system shown in FIG. 3 may further include a server 4. The server 4 may be connected to the mobile communication network as a relay station for the handshake and data forwarding between the remote controller 2 and the UAV 1.

Figure 4:
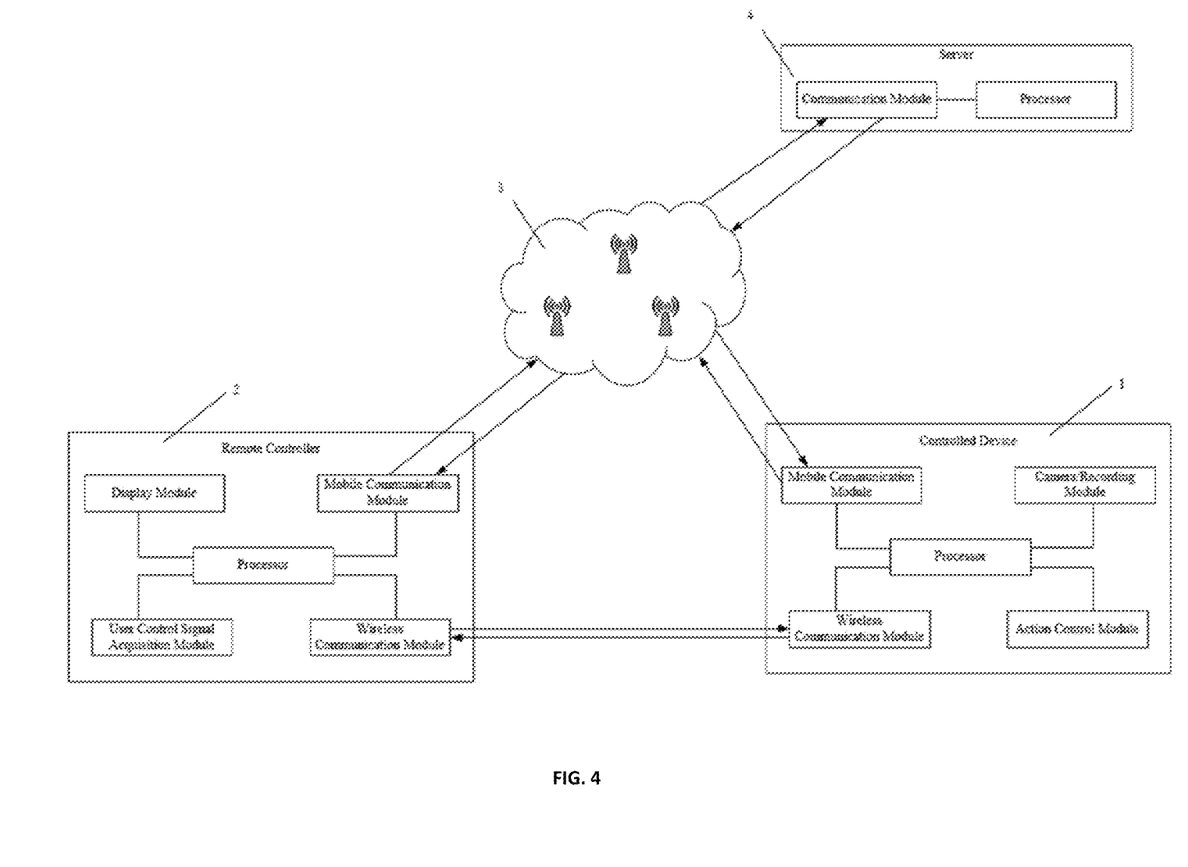
FIG. 4 is a block diagram of a remote control system according to an embodiment of the present disclosure.

FIG. 4 is a block diagram of a remote control system according to an embodiment of the present disclosure. As shown in FIG. 4, the UAV 1 as the controlled device may include a processor and a wireless communication module, a mobile communication module, a photographing/recording module, and an action control module connected to the processor. The wireless communication module and the mobile communication module of the UAV may be its first transceiver and second transceiver. The remote controller 2 of the UAV may include a processor and a wireless communication module, a mobile communication module, a display module, and a user control signal acquisition module connected to the processor. Similarly, the wireless communication module and the mobile communication module of the remote controller may be its first transceiver and second transceiver. The wireless communication modules of the UAV 1 and the remote controller 2 may directly establish a wireless communication connection, and the mobile communication modules of the UAV 1 and the remote controller 2 may be respectively establishing a mobile communication connection with a mobile communication network 3. In addition, the remote control system may further include a server 4 connected to the mobile communication network 3. The server 4 may include a processor and a communication module connected to the processor.

It can be seen that the remote control system of the present disclosure adds a mobile communication module to each of the remote controller and the controlled device of the conventional wireless communication connection remote control system. As such, the remote controller and the controlled device may communicate directly through the original wireless communication connection or communicate indirectly through the mobile communication network.

In one embodiment, since the remote controller and the controlled device may need to support the communication connection of the two communication modes, it may be necessary to consider the cooperation between the two communication modes. In addition, based on the present disclosure, the cooperation method may be switched automatically or manually depending on the situation. Therefore, the processors of the remote controller and the controlled device may respectively execute corresponding applications to respectively control the respective mobile communication module and the wireless communication module to start, stop, or change the cooperation method.

Figure 5:
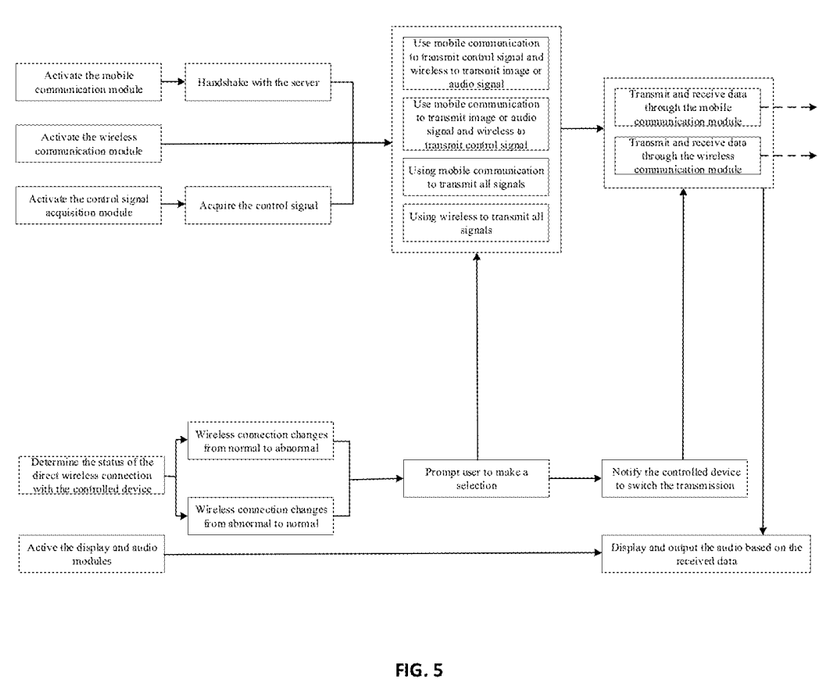
FIG. 5 is a flowchart illustrating an operation of a remote controller according to an embodiment of the present disclosure.

FIG. 5 is a flowchart illustrating an operation of a remote controller of the embodiment mentioned above and FIG. 6 is a flowchart illustrating an operation of a controlled device of the embodiment mentioned above. In one embodiment, a switching strategy (cooperation strategy) of the cooperation method between the wireless communication connection and the mobile communication connection may be to use the wireless communication connection first.

The cooperation strategy of using the wireless communication connection first may include using the wireless communication connection as long as the wireless communication connection may be normal; temporarily switching to the mobile communication connection only when the wireless communication connection may be abnormal. The abnormality may include signal instability, signal disconnection, etc. that may be caused by an occlusion of the wireless signal or long distance. In order to implement the cooperation method, it may be necessary to monitor and determine the state of the wireless communication connection in real time. By using this method, when the wireless communication connection is normal, a good experience of low delay and high bandwidth between the remote controller and the controlled device may be ensured; and when the distance is long, the interference is strong, or an obstacle is blocking the communication, the controlled device may be in a controlled state and remotely controlled by the operator so the controlled device may leave a danger zone. Once the directly connected wireless communication connection returns to normal, the communication connection may be switched back to the direct connection to reduce the operating cost and the transmission delay.

That is, by using the wireless communication connection first, the stability of the communication between the remote controller and the controlled device may be improved, the operating range of the controlled device may be extended, the security of the controlled device may be improved, and the operating cost may be reduced.

Figure 6:
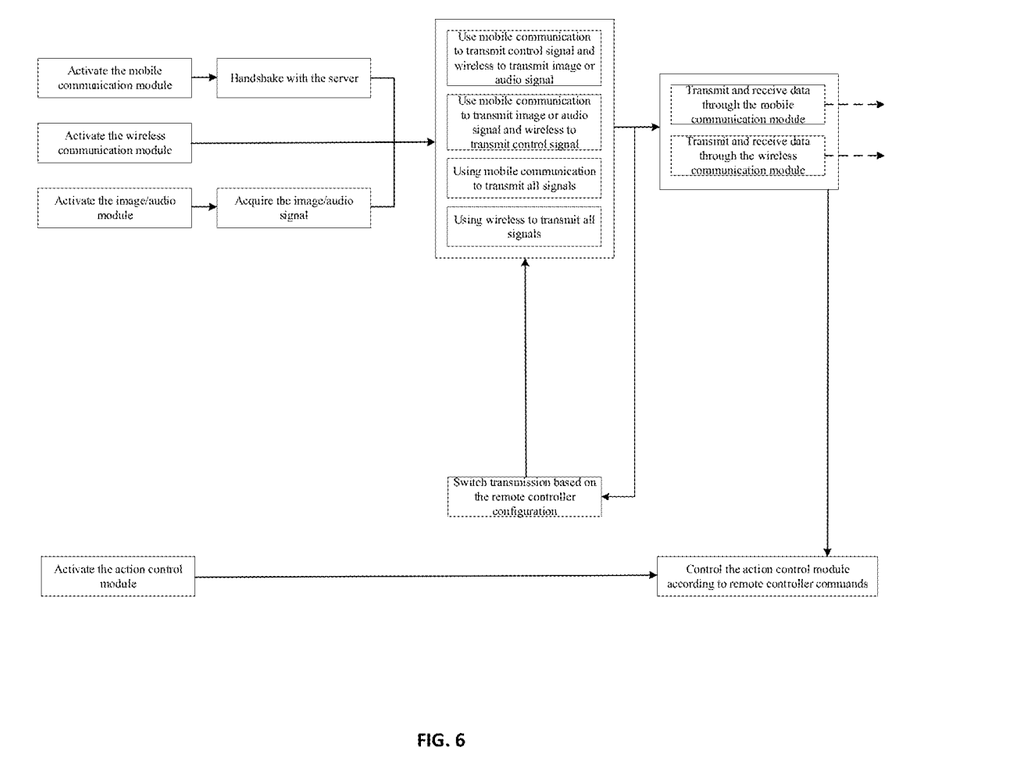
FIG. 6 is a flowchart illustrating an operation of a controlled device according to an embodiment of the present disclosure.

As shown in FIG. 5 and FIG. 6, the wireless communication modules and the mobile communication modules of the remote controller 2 as the remote controller and the UAV 1 as the controlled device may start working immediately after the power is turned on, and the two wireless communication modules may directly establish a wireless communication connection. At the same time, the two mobile communication modules may both establish a handshake connection with the server 4 in the mobile communication network 3 to establish an indirectly connected mobile communication connection between the remote controller 2 and the UAV 1. The remote controller and the controlled device may also perform a handshake connection through the server 4. As such, the server 4 may be skipped and the remote controller and the controlled device may communicate with each other to reduce the delay.

When the wireless communication is established, the connection state of the wireless communication connection may be monitored and determined in real time, and the cooperation method between the wireless communication connection and the mobile communication connection may be switched automatically or a user may be prompted to change it manually based on the connection state. As mentioned earlier, the cooperation strategy may prioritize the use of the wireless communication connection.

In one embodiment, when the monitoring of the connection state of the wireless connection indicates the wireless communication connection (the first communication network) is normal (a first signal state), the mobile communication connection may remain silent or maintain a heartbeat connection with an extremely small data size. When the wireless communication is established, the connection state of the wireless communication connection may be monitored and determined in real time. When the wireless communication connection (the first communication network) is abnormal (s second signal state), the communication connection may be quickly switched to the mobile communication network. Therefore, in one embodiment, under the control of the processor, the wireless communication module of the remote controller may periodically check the signal strength, the communication state, and the like of the wireless communication connection. The connection state information may be transmitted to the processor, and the processor may perform a corresponding determination based on the communication state information to implement the switch mentioned above.

In addition, the cooperation strategy that prioritizes the use of the wireless communication connection may further include the following cooperative switching method: when the wireless communication connection is disconnected or the signal is weak and the mobile communication connection is normal, at least a part of the signal transmission may be switched to the mobile communication connection. The switching may include an automatic switching and a manually switching in which a user may be prompted to perform an operation. Correspondingly, the cooperation strategy may further include the following cooperative switching method: when the mobile communication connection is used for signal transmission and the wireless communication connection is detected to be normal, at least a part of the signal transmission may be switched to the wireless communication connection. Of course, during the manual switching, the user may also choose to maintain the current communication connection state.

In one embodiment, a partial signal may include at least a part of the control signal or the data signal. The control signal may be a control signal for controlling the action of an action control module of the UAV 1. The data signal may generally refer to a signal collected by a camera/recording module of the UAV 1 and the signal may include an image signal, a video signal, and an audio signal. Therefore, the partial signal may be a partial control signal or one or two of the image signal, video signal or audio signal. In addition, the image signal, video signal or audio signal may be transmitted as a data signal compressed at a specific bit rate. In one embodiment, when the switched partial signal includes a data signal compressed at a specific bit rate, the bit rate may be automatically configured at the time of switching or configure by a user operation.

As shown in FIG. 5 and FIG. 6, in one embodiment, the remote controller 2 may monitor and determine the connection state of the wireless communication connection in real time. When the wireless communication connection becomes abnormal from normal or vice versa, a display module may be used to prompt the user to perform an operation to select one of the following cooperation methods of the two communication modes:

A: use the mobile communication connection to transmit the control signal and the wireless communication connection to transmit the image and audio signals;

B: use the mobile communication connection to transmit image and audio signals and the wireless communication connection to transmit the control signal;

C: use the mobile communication connection to transmit all signals; and

D: use the wireless communication connection to transmit all signals.

After the user selects a method, the processor may control the wireless communication module and the mobile communication module to perform the corresponding operations based on the selection to perform the signal transmission based on the cooperation method selected by the user. At the same time, the processor may transmit a control command to the controlled device through the wireless communication module and/or the mobile communication module to instruct the controlled device to perform the corresponding cooperative switching method mentioned above.

Figure 7:
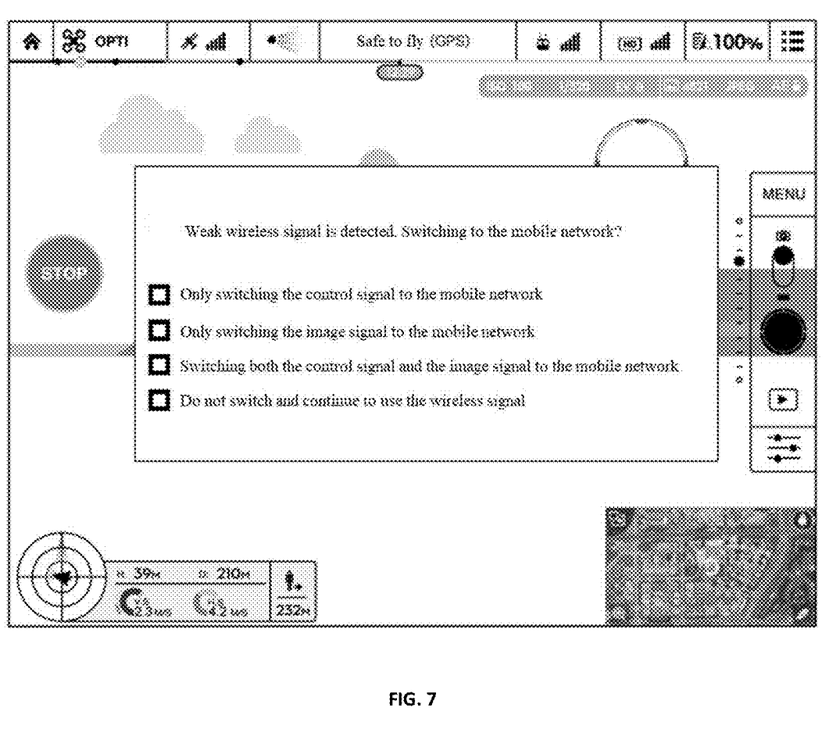
FIG. 7 is a graphical interface of a display module of a remote controller prompting a user to perform a switch according to an embodiment of the present disclosure.

FIG. 7 is a graphical interface of a display module of a remote controller of a remote control system prompting a user to perform a switch according to an embodiment of the present disclosure. As shown in FIG. 7, a pop-up window on the graphical interface of the remote controller 2 may ask the user whether to switch to the mobile communication connection. The switching options may include only switching the control signal to the mobile network; only switching the image signal to the mobile network; switching both the control signal and the image signal to the mobile network; and do not switch and continue to use the wireless signal. The communication mode may then be switched based on the user selection.

In one embodiment, when the user chooses to switch to the mobile communication network, the UAV may reduce the mobility of its motion as needed due to the increased delay.

In one embodiment, if the user chooses to only switching the control signal to the mobile network, an uplink may only transmit the operator's control signal, a downlink may only transmit the state, position, speed, and other information of the UAV, and the amount of data may be low, thereby reducing network traffic and cost. Further, the posture, direction, etc. of the controlled device may be simulated on the graphical interface based on the state information, such that the operator may have a more intuitive sensation.

Figure 8:
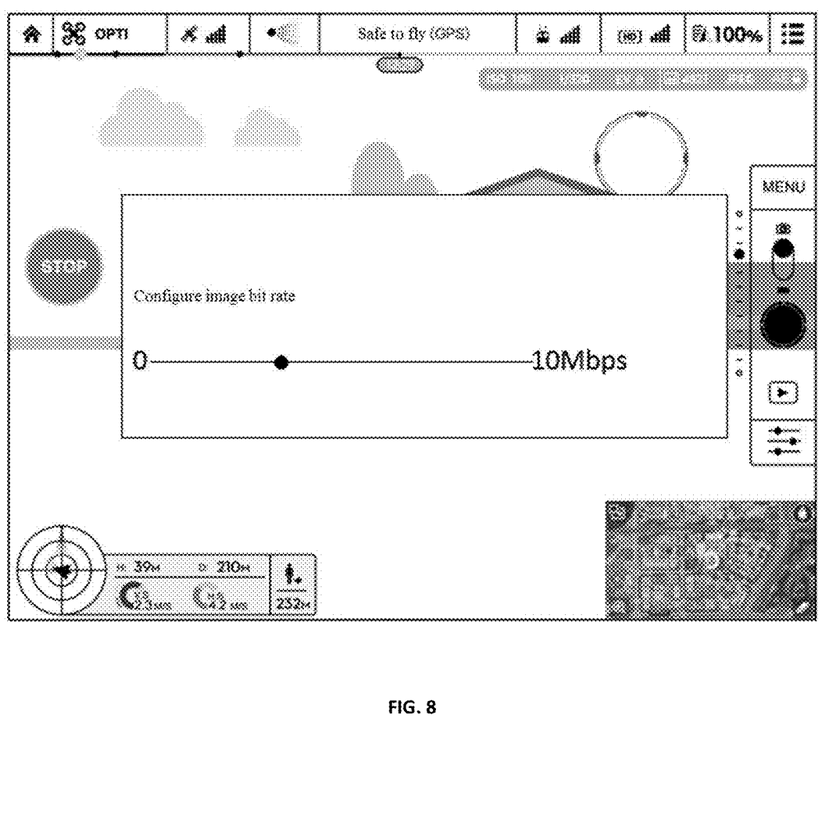
FIG. 8 is an interface of a display module of a remote controller prompting a user to perform an image/audio bit rate setting according to an embodiment of the present disclosure.

FIG. 8 is an interface of a display module of a remote controller of a remote control system prompting a user to perform an image/audio bit rate setting according to an embodiment of the present disclosure. As shown in FIG. 8, if the user chooses to only switch the image signal to the mobile network or switching both the control signal and the image signal to the mobile network, a slider for adjusting the image and audio bit rate may be displayed on the graphical interface. As such, the user may select a corresponding bandwidth based on the cost.

Figure 9:
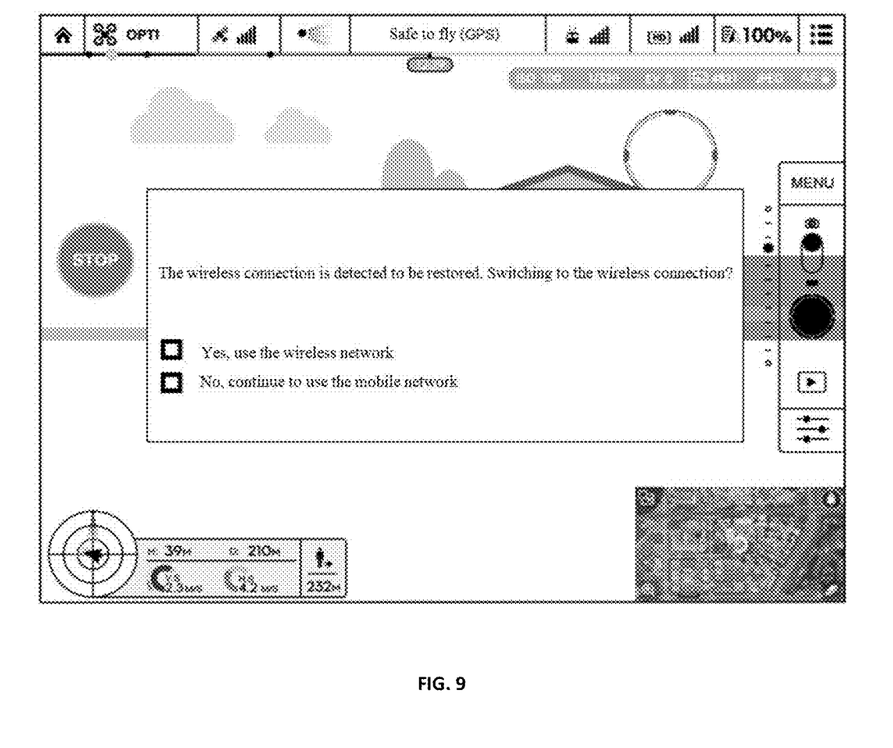
FIG. 9 is an interface of a display module of a remote controller prompting a user when a wireless communication connection is restored according to an embodiment of the present disclosure.

FIG. 9 is an interface of a display module of a remote controller of a remote control system prompting a user when a wireless communication connection is restored according to an embodiment of the present disclosure. As shown in FIG. 9, after switching to the mobile communication network, the remote controller may continue to periodically monitor the signal strength and connection state of the wireless communication connection. If the wireless communication connection is found to be normal, a pop-up window may prompt the user that the direct connection signal has been restored and whether to switch connection back to the wireless connection.

Figure 10:
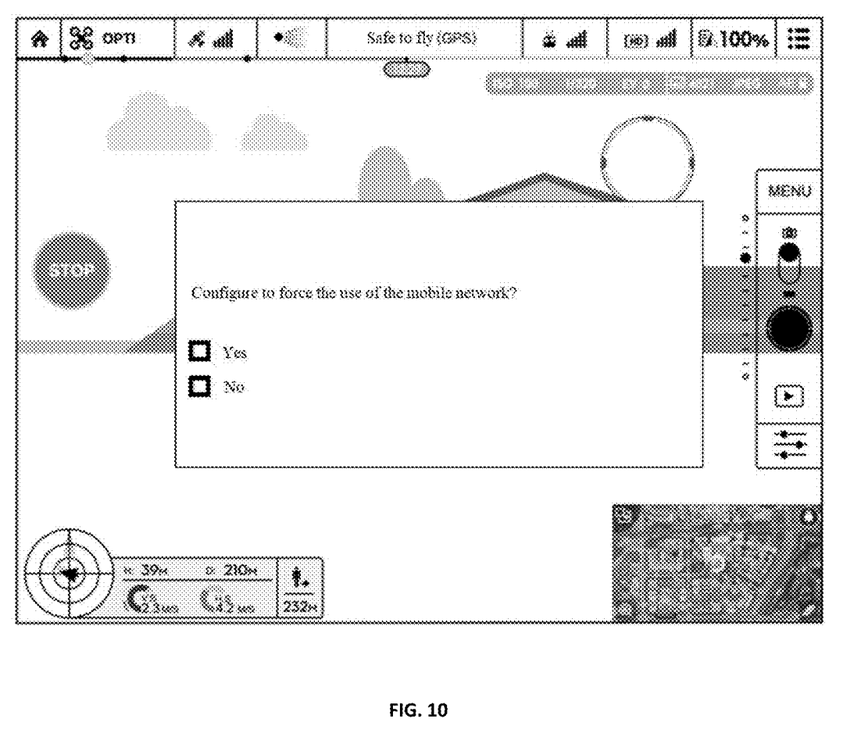
FIG. 10 is an interface of a display module of a remote controller prompting a user whether to force the use of a mobile communication network according to an embodiment of the present disclosure.

FIG. 10 is an interface of a display module of a remote controller of a remote control system prompting a user whether to force the use of a mobile communication network according to an embodiment of the present disclosure. As shown in FIG. 10, this embodiment further provides an option to force the use of the mobile communication network. Even if the signal of the wireless direct connect is strong, the mobile communication network may still be forcibly used. In addition, the direct connection and the mobile communication network may simultaneously transmit and receive data for specific users. In this case, when the UAV as the controlled device transmit the image and audio data stream through the wireless communication connection and the mobile communication connection, two independent image and audio data streams with different compression ratios based on the bandwidth of the two connections, and the image and audio data stream may be transmitted to the remote controller through two channels.

Referring to FIG. 6 again, in one embodiment, when the power of the UAV 1 as the controlled device is turned on, in addition to activating the two communication modes and establishing the connections respectively as the remote controller, the camera/audio module may also be activated to prepare of photography or recording. At the same time, the action control module may also be activated to perform the corresponding action. The camera/recording module and the action control module may be both controlled by the processor by executing a corresponding application. Correspondingly, when the wireless communication module and/or the mobile communication module of the UAV 1 receives the cooperation method to switch the two communication connections, the processor may control the wireless communication module and the mobile communication module to perform the corresponding communication connection switching on one hand, and further control the corresponding operation of the action control module based on a predetermined program one the other hand to adapt to the communication connection method after switching the cooperative mode.

The object, technical solutions, and advantageous effect of the present disclosure are further described in detail in the above specific embodiments. It should be appreciated that the above description is only specific embodiments of the present disclosure and the embodiment is not used to limit the present disclosure. It will be understood by those skilled in the art that various modifications, equivalent substitutions and improvements may be made therein without departing from the principles and spirit of the present invention and fall within the scope of the present disclosure.

While the disclosure has been shown and described with reference to certain exemplary embodiments thereof, it will be understood by those skilled in the art that various changes in form and details may be made therein without departing from the spirit and scope of the disclosure as defined by the appended claims. Accordingly, the scope of the disclosure is not to be limited by the above embodiments but by the claims and the equivalents thereof.

What is claimed is:

1. A control method for an UAV (Unmanned Aerial Vehicle) and a remote controller, the method comprising:
   transmitting a signal to the remote controller through a first communication network;
   monitoring a state of the first communication network;
   in response to the state of the first communication network not meeting a state condition, switching from the first communication network to a second communication network to transmit the signal to the remote controller, the state condition including one or more of: a signal stability of the first communication network meeting a stability condition, a signal delay of the first communication network meeting a stability condition, or an available signal bandwidth of the first communication network meeting a bandwidth condition; and
   in response to the state of the first communication network meeting the state condition and the signal being transmitted through the second communication network, switching from the second communication network to the first communication network to transmit the signal to the remote controller.

2. The method of claim 1, further comprising:
   receiving a first signal switching command from the remote controller; and
   in response to receiving the first signal switching command, switching from the first communication network to the second communication network to transmit the signal to the remote controller.

3. The method of claim 2, further includes:
   receiving a second signal switching command from the remote controller; and
   switching from the second communication network to the first communication network to transmit the signal to the remote controller after receiving the second signal switching command.

4. The method of claim 1, wherein the first communication network is a wireless communication network of a first communication protocol and the second communication network is a wireless communication network of a second communication protocol.

5. The method of claim 1, wherein the signal is an image signal, and the method further includes:
   adjusting a bit rate of the image signal.

6. The method of claim 1, wherein the signal is a status signal of the UAV and the status signal includes data indicating one or more of a location, a speed, and an altitude of the UAV.

7. The method according to claim 1, further comprising:
in response to switching from the first communication network to the second communication network to transmit the signal, reducing a mobility of the UAV.

8. A control method of a remote controller communicating with an UAV, the method comprising:
transmitting a signal to the UAV through a first communication network;
monitoring a state of the first communication network;
in response to the state of the first communication network not meeting a state condition, switching from the first communication network to a second communication network to transmit the signal to the UAV, the state condition including one or more of: a signal stability of the first communication network meeting a stability condition, a signal delay of the first communication network meeting a stability condition, or an available signal bandwidth of the first communication network meeting a bandwidth condition; and
in response to the state of the first communication network meeting the state condition and the signal being transmitted through the second communication network, switching from the second communication network to the first communication network to transmit the signal to the UAV.

9. The method of claim 8, wherein the first communication network is a wireless communication network of a first communication protocol and the second communication network is a wireless communication network of a second communication protocol.

10. The method of claim 8, wherein the signal is a control signal.

11. The method of claim 8, further includes:
receiving a signal switching command from the UAV; and
switching from the second communication network to the first communication network to transmit the signal to the UAV after receiving the signal switching command.

12. An UAV control system including an UAV and a remote controller, the UAV communicating with the remote controller, the UAV comprising:
a first transceiver for communicating with the remote controller through a first communication network;
a second transceiver for communicating with the remote controller through a second communication network; and
one or more processors that are configured to:
transmit a first signal to the remote controller through the first transceiver though the first communication network;
monitor a state of the first communication network;
in response to the state of the first communication network not meeting a state condition, switch from the first transceiver to the second transceiver to transmit the first signal to the remote controller though the second communication network, the state condition including one or more of: a signal stability of the first communication network meeting a stability condition, a signal delay of the first communication network meeting a stability condition, or an available signal bandwidth of the first communication network meeting a bandwidth condition;
and the remote controller comprising:
a first transceiver for communicating with the UAV through the first communication network;
a second transceiver for communicating with the UAV through the second communication network; and
one or more processors that are configured to:
transmit a signal to the UAV through the second communication network;
monitor the state of the first communication network; and
in response to the state of the first communication network meeting the state condition and the signal being transmitted through the second communication network, switch from the second communication network to the first communication network to transmit the second signal to the UAV.

13. The UAV control system of claim 12, wherein the one or more processors of the UAV are configured to:
receive a first signal switching command from the remote controller; and
in response to receiving the first signal switching command, switch from the first transceiver to the second transceiver to transmit the first signal to the remote controller though the second communication network.

14. The UAV control system of claim 13, wherein the first communication network is a wireless communication network of a first communication protocol and the second communication network is a wireless communication network of a second communication protocol.

15. The UAV control system of claim 14, wherein the first signal is an image signal and the one or more processors are further configured to adjust a bit rate of the image signal.

16. The UAV control system of claim 15, wherein the one or more processors of the UAV are further configured to:
receive a second signal switching command from the remote controller; and
switch from the second transceiver to the first transceiver to transmit the first signal to the remote controller after receiving the second signal switching command.

17. The UAV control system of claim 14, wherein the first signal is a status signal of the UAV and the status signal includes data indicating one or more of a location, a speed, and an altitude of the UAV.

* * * * *